(12) United States Patent
Fattal et al.

(10) Patent No.: US 11,467,421 B2
(45) Date of Patent: Oct. 11, 2022

(54) MULTI-DIRECTIONAL BACKLIGHT, MULTI-USER MULTIVIEW DISPLAY, AND METHOD

(71) Applicant: LEIA INC., Menlo Park, CA (US)

(72) Inventors: David A. Fattal, Menlo Park, CA (US); Thomas Hoekman, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 17/370,989

(22) Filed: Jul. 8, 2021

(65) Prior Publication Data

US 2021/0333570 A1    Oct. 28, 2021

Related U.S. Application Data

(63) Continuation of application No. PCT/US2020/014464, filed on Jan. 21, 2020.
(Continued)

(51) Int. Cl.
*G02B 30/33* (2020.01)
*F21V 8/00* (2006.01)
*G02B 5/18* (2006.01)

(52) U.S. Cl.
CPC ........... *G02B 30/33* (2020.01); *G02B 6/0036* (2013.01); *G02B 6/0038* (2013.01);
(Continued)

(58) Field of Classification Search
CPC .... G02B 6/0036; G02B 6/0038; G02B 6/004; G02B 6/0041; G02B 6/0043; G02B 6/0075; G02B 6/0076; G02B 30/33
See application file for complete search history.

(56) References Cited

U.S. PATENT DOCUMENTS 9,128,226 B2    9/2015 Fattal et al.
9,201,270 B2    12/2015 Fattal et al.
(Continued)

FOREIGN PATENT DOCUMENTS

KR    20140114201 A    9/2014
KR    20150125407 A    11/2015
(Continued)

OTHER PUBLICATIONS

International Search Report and Written Opinion (ISRWO) by International Searching Authority (ISA) Korean Intellectual Property Office (KIPO) dated Jun. 26, 2020 (11 pages) for foreign counterpart parent PCT Application No. PCT/US2020/014464.
(Continued)

*Primary Examiner* — Keith G. Delahoussaye
(74) *Attorney, Agent, or Firm* — J. Michael Johnson

(57) ABSTRACT

A multi-directional backlight and a multi-user multiview display provide emitted light and associated multiview images having different mutually exclusive angular ranges and different user-specific view zones. The multi-directional backlight includes first and second multiview backlights, each of which includes multibeam elements configured to provide emitted light having directional light beams with directions corresponding to view directions of a respective multiview images. The emitted light provided by the first multiview backlight has a first angular range that is mutually exclusive of a second angular range of emitted light provided by the second multiview backlight, at respective first and second convergence distances. The multi-user multiview display includes a first multiview display configured to provide a first multiview image to a first user in a first view zone and a second multiview display configured to provide a second multiview image to a second user in a second view zone.

21 Claims, 9 Drawing Sheets

Related U.S. Application Data

(60) Provisional application No. 62/797,160, filed on Jan. 25, 2019.

(52) U.S. Cl.
CPC ......... *G02B 6/0075* (2013.01); *G02B 6/0076* (2013.01); *G02B 5/18* (2013.01)

(56) References Cited

U.S. PATENT DOCUMENTS

| | | |
|---|---|---|
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 9,746,668 B2 | 8/2017 | Kim et al. |
| 9,785,119 B2 | 10/2017 | Taff et al. |
| 10,345,505 B2 | 7/2019 | Fattal |
| 10,551,546 B2 | 2/2020 | Fattal |
| 10,649,128 B2 | 5/2020 | Fattal et al. |
| 10,798,371 B2 | 10/2020 | Fattal |
| 10,802,212 B2 | 10/2020 | Fattal |
| 10,802,443 B2 | 10/2020 | Fattal |
| 10,810,917 B2 | 10/2020 | Fattal |
| 10,830,939 B2 | 11/2020 | Fattal et al. |
| 10,838,134 B2 | 11/2020 | Fattal et al. |
| 10,928,564 B2 | 2/2021 | Fattal |
| 10,928,677 B2 | 2/2021 | Aieta et al. |
| 10,969,627 B2 | 4/2021 | Fattal et al. |
| 11,016,235 B2 | 5/2021 | Fattal et al. |
| 2009/0322986 A1 | 12/2009 | Wei et al. |
| 2012/0200807 A1 | 8/2012 | Wei et al. |
| 2013/0169518 A1 | 7/2013 | Wu et al. |
| 2013/0201723 A1* | 8/2013 | Gourlay ............... G02B 6/0036 362/613 |
| 2015/0192827 A1 | 7/2015 | Shestak et al. |
| 2015/0205563 A1 | 7/2015 | Inada et al. |
| 2015/0324002 A1 | 11/2015 | Quiet et al. |
| 2016/0360187 A1* | 12/2016 | Smithwick ............. G02B 30/27 |
| 2017/0090096 A1* | 3/2017 | Fattal ................... G02B 6/0018 |
| 2017/0289530 A1 | 10/2017 | Smithwick et al. |
| 2017/0363794 A1 | 12/2017 | Wan et al. |
| 2018/0188439 A1* | 7/2018 | Kim .................... G02B 6/0061 |
| 2018/0306965 A1 | 10/2018 | Fattal |
| 2019/0302336 A1 | 10/2019 | Fattal et al. |
| 2019/0302340 A1 | 10/2019 | Ma et al. |
| 2019/0339452 A1 | 11/2019 | Fattal et al. |
| 2020/0018891 A1 | 1/2020 | Fattal et al. |
| 2020/0301165 A1 | 9/2020 | Fattal |
| 2020/0310135 A1 | 10/2020 | Fattal |

FOREIGN PATENT DOCUMENTS

| | | |
|---|---|---|
| WO | 2012038856 A1 | 3/2012 |
| WO | 2018187019 A1 | 10/2018 |
| WO | 2020131087 A1 | 6/2020 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

\* cited by examiner

MULTI-DIRECTIONAL BACKLIGHT, MULTI-USER MULTIVIEW DISPLAY, AND METHOD

CROSS-REFERENCE TO RELATED APPLICATIONS

This application is a continuation application of and claims the benefit of priority to International Patent Application No. PCT/US2020/014464, filed Jan. 21, 2020, which claims priority to U.S. Provisional Application Ser. No. 62/797,160, filed on Jan. 25, 2019, the entire contents of both of which are herein incorporated by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
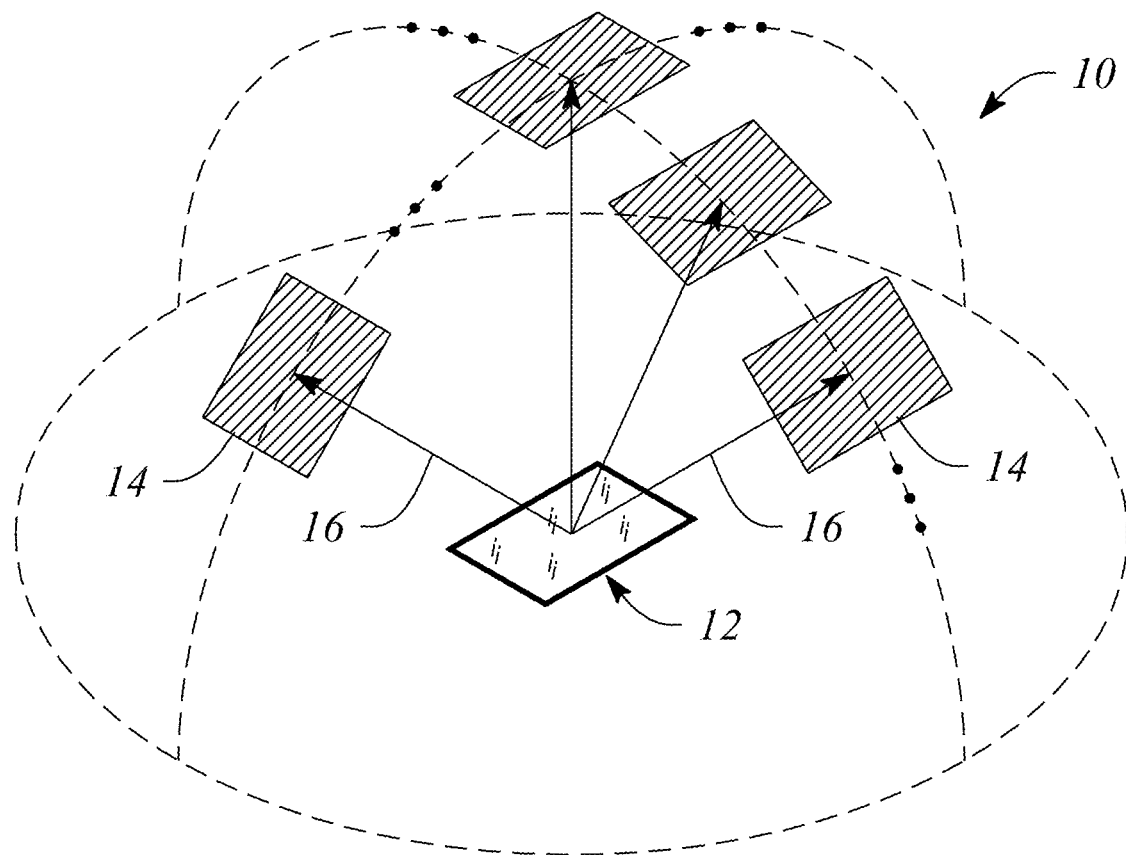
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Embodiments in accordance with the principles described herein provide multi-directional backlighting with application to a multi-user multiview display that may feature multiple configurations. In particular, a multi-directional backlight may comprise two or more adjacent multiview backlights that are oriented at different angles. The different angles may be adjustable or variable, in some embodiments. In various embodiments, illumination regions or viewing zones of emitted light provided by the two or more adjacent multiview backlights of the multi-directional backlight feature mutually exclusive angular ranges and may have backlight-specific convergence distances. Further, the multiview backlights of the multi-directional backlight employ multibeam emitters to provide emitted light as a plurality of directional light beams directed in a viewing direction within the mutually exclusive angular ranges. In some embodiments, the directional light beams of emitted light provided by the multibeam emitters may have different principal angular directions corresponding to view directions of a multiview image or equivalently of a multiview display, according to some embodiments of the principles described herein. The directional light beams having the different principal angular directions (also referred to as 'directional light beams') may be employed to display information including multiview or three-dimensional (3D) information. For example, the differently directed scattered-out light beams may be modulated and serve as pixels of a 3D or multiview electronic display (e.g., a 'glasses free' or autostereoscopic electronic display). As such, a multi-user multiview display may include two or more adjacent multiview displays having view zones exhibiting the mutually exclusive angular ranges and providing convergence distances targeted to different users, according to various embodiments.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in many smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. Uses of unilateral backlighting and unilateral multiview displays described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

Figure 1B:
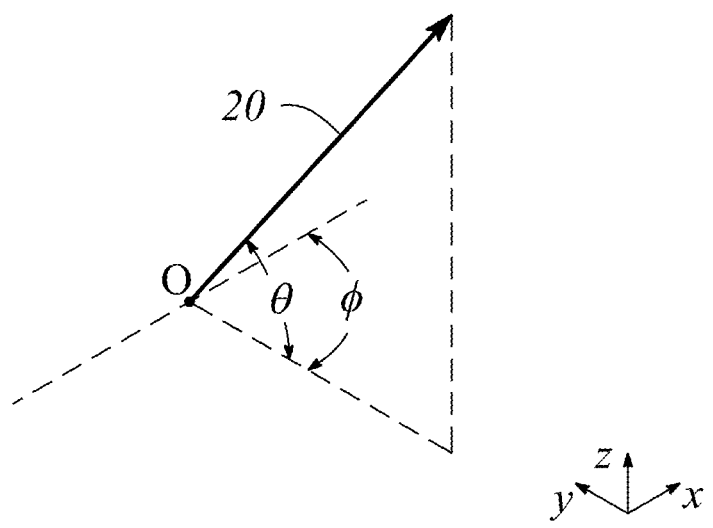
FIG. 1B illustrates a graphical representation of angular components of a light beam having a particular principal angular direction corresponding to a view direction of a multiview display in an example, according to an embodiment consistent with the principles described herein.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane). FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' may include more than two different views (i.e., a minimum of three views and generally more than three views), by definition herein. As such, 'multiview display' as employed herein may be distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of pixels representing 'view' pixels in each view of a plurality of different views of a multiview image provided by a multiview display. Likewise, a 'view pixel' is defined herein as a pixel of a view of the multiview image. In particular, a multiview pixel may have an individual pixel corresponding to or representing a view pixel in each of the different views of the multiview image. For example, the multiview pixel may comprise a set of light valves in a light valve array of the multiview display and a pixel of the multiview pixel may comprise a light valve of the light valve array. In turn, the view pixels may be provided by modulation of light using the light valves such that a pixel or light valve of the light valve array corresponds to or provides the modulation to create the corresponding view pixel. Moreover, the pixels of the multiview pixel are so-called 'directional pixels' in that each of the pixels is associated with a predetermined view direction of a corresponding one of the different views, by definition herein. Further, according to various examples and embodiments, the different view pixels represented by the pixels of a multiview pixel may have equivalent or at least substantially similar locations or coordinates in each of the different views. For example, a first multiview pixel may have individual pixels corresponding to view pixels located at $\{x_1, y_1\}$ in each of the different views of a multiview image, while a second multiview pixel may have individual pixels corresponding to view pixels located at $\{x_2, y_2\}$ in each of the different views, and so on. In some embodiments, a number of pixels in a multiview pixel may be equal to a number of different views of the multiview display. Further, according to some embodiments, a number of multiview pixels of the multiview display may be substantially equal to a number of 'view' pixels (i.e., pixels that make up a selected view) in the multiview display views.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piecewise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

By definition herein, a 'multibeam element' is a structure or element of a backlight or a display that produces light that includes a plurality of directional light beams. In some embodiments, the multibeam element may be optically coupled or connected to a light guide of a backlight to provide the directional light beams by coupling or scattering out a portion of light guided in the light guide. In other embodiments, the multibeam element may generate light emitted as the light beams (e.g., may comprise a light source or be an active emitter). Further, the light beams of the plurality of directional light beams produced by a multibeam element have different principal angular directions from one another, by definition herein. In particular, by definition, a directional light beam of the plurality has a predetermined principal angular direction that is different from another directional light beam of the directional light beam plurality. According to some embodiments, a size of the multibeam element may be comparable to a size of a light valve used in a display that is associated with the multibeam element (e.g., a multiview display). In particular, the multibeam element size may be between about one quarter and about two times the light valve size, in some embodiments.

According to various embodiments, the directional light beam plurality may represent a light field. For example, the directional light beam plurality may be confined to a substantially conical region of space or have a predetermined angular spread that includes the different principal angular directions of the light beams in the light beam plurality. As such, the predetermined angular spread of the directional light beams in combination (i.e., the directional light beam plurality) may represent the light field.

According to various embodiments, the different principal angular directions of the various directional light beams in the directional light beam plurality are determined by a characteristic including, but not limited to, a size (e.g., one or more of length, width, area, and etc.) of the multibeam element along with other characteristics. For example, in a diffractive multibeam element, a 'grating pitch' or a diffractive feature spacing and an orientation of a diffraction grating within diffractive multibeam element may be characteristics that determine, at least in part, the different principal angular directions of the various directional light beams. In some embodiments, the multibeam element may be considered an 'extended point light source', i.e., a plurality of point light sources distributed across an extent of the multibeam element, by definition herein. Further, a directional light beam produced by the multibeam element may have a principal angular direction given by angular components $\{\theta, \phi\}$, as described below with respect to FIG. 1B.

Herein, an 'angle-preserving scatterer' or equivalently an 'angle-preserving scattering feature' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering feature is a function of an angular spread $\sigma$ of the incident light (i.e., $\sigma_s = f(\sigma)$). In some embodiments, the angular spread $\sigma_s$ of the scattered light is a linear function of the angular spread or collimation factor $\sigma$ of the incident light (e.g., $\sigma_s = a \cdot \sigma$, where a is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread $\sigma$ (e.g., $\sigma_s \approx \sigma$). A uniform diffraction grating (i.e., a diffraction grating having a substantially uniform or constant diffractive feature spacing or grating pitch) is an example of an angle-preserving scattering feature. A multibeam element (e.g., as variously described below) is an example of an angle-preserving scattering feature, as defined herein.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple or scatter light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively scatter out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
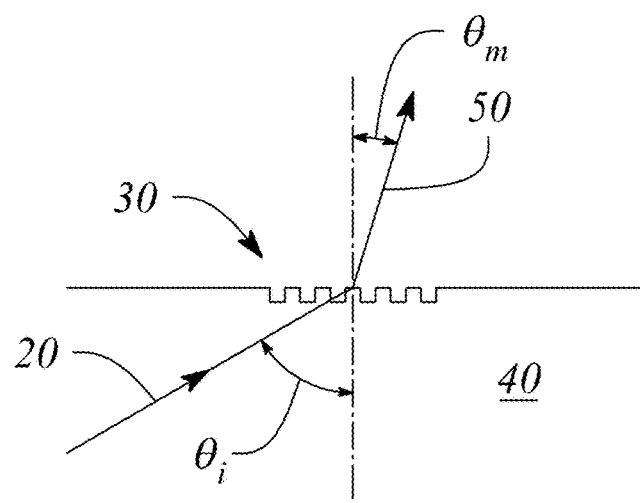
FIG. 2 illustrates a cross sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 20 incident on the diffraction grating 30 at an incident angle $\theta_i$. The light beam 20 is a guided light beam within the light guide 40. Also illustrated in FIG. 2 is a coupled-out or scattered-out light beam 50 diffractively produced and scattered out by the diffraction grating 30 as a result of diffraction of the incident light beam 20. The scattered-out light beam 50 has a diffraction angle $\theta_m$ (or 'principal angular direction' herein) as given by equation (1). The scattered-out light beam 50 may correspond to a diffraction order 'm' of the diffraction grating 30, for example.

Herein by definition, a 'slanted' diffraction grating is a diffraction grating with diffractive features having a slant angle relative to a surface normal of a surface of the diffraction grating. According to various embodiments, a slanted diffraction grating may provide unilateral scattering by diffraction of incident light.

Herein a 'collimator' is defined as substantially any optical device or apparatus that is configured to collimate light. For example, a collimator may include, but is not limited to, a collimating mirror or reflector, a collimating lens, a diffraction grating, and various combinations thereof. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor σ may specify that a majority of light rays in a beam of collimated light is within a particular angular spread (e.g., +/−σ degrees about a central or principal angular direction of the collimated light beam). The light rays of the collimated light beam may have a Gaussian distribution in terms of angle and the angular spread be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Herein, a 'multiview image' is defined as a plurality of images (i.e., greater than three images) wherein each image of the plurality represents a different view corresponding to a different view direction of the multiview image. As such, the multiview image is a collection of images (e.g., two-dimensional images) which, when display on a multiview display, may facilitate a perception of depth and thus appear to be an image of a 3D scene to a viewer, for example.

By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., >±20°). In other embodiments, the broad-angle emitted light cone angle may be greater than about thirty degrees (e.g., >±30°), or greater than about forty degrees (e.g., >±40°), or greater than about fifty degrees (e.g., >±50°). For example, the cone angle of the broad-angle emitted light may be greater than about sixty degrees (e.g., >±60°).

In some embodiments, the broad-angle emitted light cone angle may defined to be about the same as a viewing angle of an LCD computer monitor, an LCD tablet, an LCD television, or a similar digital display device meant for broad-angle viewing (e.g., about ±40-65°). In other embodiments, broad-angle emitted light may also be characterized or described as diffuse light, substantially diffuse light, non-directional light (i.e., lacking any specific or defined directionality), or as light having a single or substantially uniform direction.

Embodiments consistent with the principles described herein may be implemented using a variety of devices and circuits including, but not limited to, one or more of integrated circuits (ICs), very large scale integrated (VLSI) circuits, application specific integrated circuits (ASIC), field programmable gate arrays (FPGAs), digital signal processors (DSPs), graphical processor unit (GPU), and the like, firmware, software (such as a program module or a set of instructions), and a combination of two or more of the above. For example, an embodiment or elements thereof may be implemented as circuit elements within an ASIC or a VLSI circuit. Implementations that employ an ASIC or a VLSI circuit are examples of hardware-based circuit implementations.

In another example, an embodiment may be implemented as software using a computer programming language (e.g., C/C++) that is executed in an operating environment or a software-based modeling environment (e.g., MATLAB®, MathWorks, Inc., Natick, Mass.) that is further executed by a computer (e.g., stored in memory and executed by a processor or a graphics processor of a general purpose computer). Note that one or more computer programs or software may constitute a computer-program mechanism, and the programming language may be compiled or interpreted, e.g., configurable or configured (which may be used interchangeably in this discussion), to be executed by a processor or a graphics processor of a computer.

In yet another example, a block, a module or an element of an apparatus, device or system (e.g., image processor, camera, etc.) described herein may be implemented using actual or physical circuitry (e.g., as an IC or an ASIC), while another block, module or element may be implemented in software or firmware. In particular, according to the definitions herein, some embodiments may be implemented using a substantially hardware-based circuit approach or device (e.g., ICs, VLSI, ASIC, FPGA, DSP, firmware, etc.), while other embodiments may also be implemented as software or firmware using a computer processor or a graphics processor to execute the software, or as a combination of software or firmware and hardware-based circuitry, for example.

Further, as used herein, the article 'a' is intended to have its ordinary meaning in the patent arts, namely 'one or more'. For example, 'a multiview display' means one or more multiview displays and as such, 'the multiview display' means 'the multiview display(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
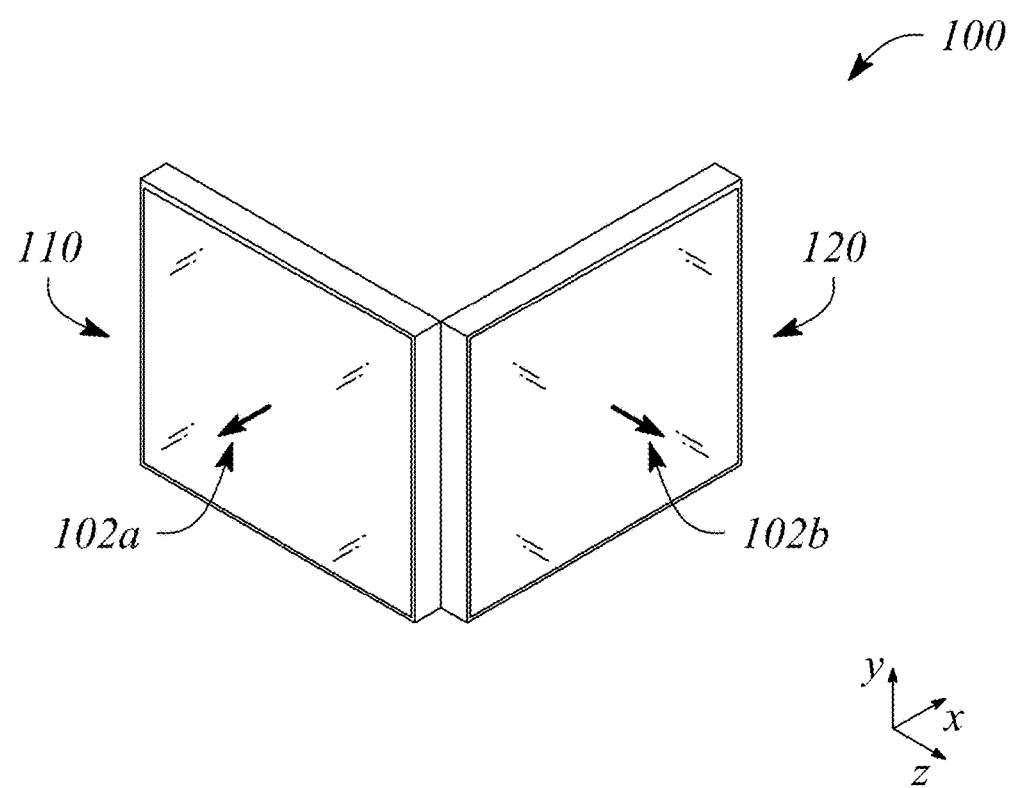
FIG. 3A illustrates a perspective view of a multi-directional backlight in an example, according to an embodiment consistent with the principles described herein.
Figure 3B:
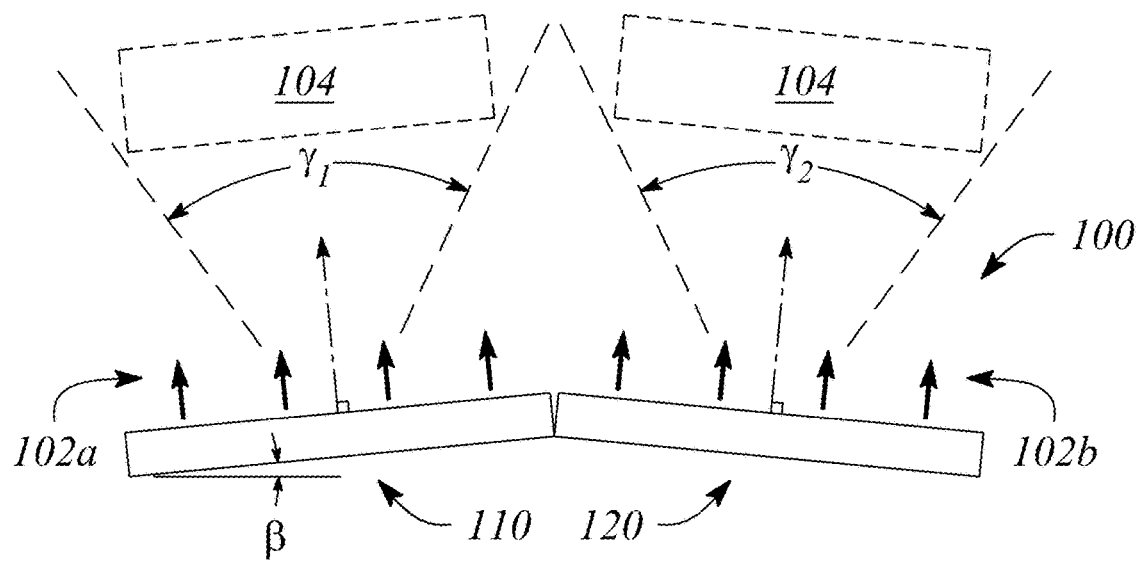
FIG. 3B illustrates a top or side view of a multi-directional backlight in an example, according to an embodiment consistent with the principles described herein.
Figure 3C:
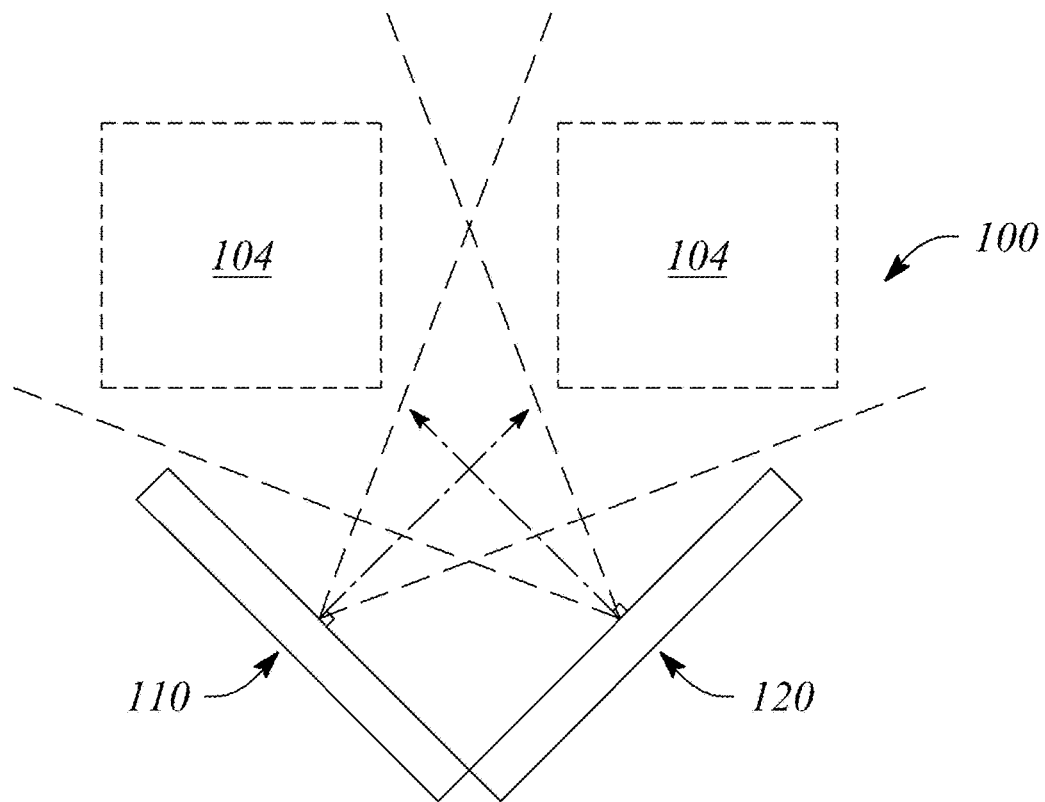
FIG. 3C illustrates a top or side view of a multi-directional backlight in another example, according to an embodiment consistent with the principles described herein.

According to some embodiments of the principles described herein, a multi-directional backlight is provided. FIG. 3A illustrates a perspective view of a multi-directional backlight 100 in an example, according to an embodiment consistent with the principles described herein. FIG. 3B illustrates a top or side view of a multi-directional backlight 100 in an example, according to an embodiment consistent with the principles described herein. FIG. 3C illustrates a top or side view of a multi-directional backlight 100 in another example, according to an embodiment consistent with the principles described herein. The side views of FIG. 3B-3C may represent the multi-directional backlight 100 as viewed in an x-z plane, for example.

As illustrated in FIGS. 3A-3C, the multi-directional backlight 100 comprises a first multiview backlight 110 and a second multiview backlight 120. The first multiview backlight 110 comprises multibeam elements configured to provide emitted light 102a having first angular range $\gamma_1$. According to various embodiments, the emitted light 102a provided by the first multiview backlight 110 and having the first angular range $\gamma_1$ comprises directional light beams with directions corresponding to view directions of a first multiview image having a first convergence distance. The second multiview backlight 120 comprises multibeam elements configured to provide emitted light 102b having second angular range $\gamma_2$. According to various embodiments, the emitted light 102b provided by the second multiview backlight 120 and having the second angular range $\gamma_2$ comprises directional light beams with directions corresponding to view directions of a second multiview image having a second convergence distance.

According to various embodiments, the first angular range $\gamma_1$ of the emitted light 102a provided by the first multiview backlight 110 and second angular range $\gamma_2$ of the emitted light 102b provided by the second multiview backlight 120 are mutually exclusive angular ranges, i.e., the first and second angular ranges $\gamma_1$, $\gamma_2$ do not overlap one another. In particular, the first and second angular ranges $\gamma_1$, $\gamma_2$ are mutually exclusive in that the ranges do not overlap one another within a viewing zone 104 corresponding to the first and second convergence distances, by definition herein. In FIGS. 3B-3C, the viewing zones 104 corresponding to the first and second multiview backlights 110, 120 are illustrated as rectangular boxes, by way of example and not limitation.

In some embodiments, the second multiview backlight 120 has a cant relative to the first multiview backlight 110 defining a cant angle β. In some embodiments, the cant angle β may be between about zero degrees (0°) and about forty-five degrees (45°). For example, the cant angle β may be about ten degrees (10°), or about twenty degrees (20°) or about thirty-five degrees (35°). In some embodiments, the first and second convergence distances and, by extension, the cant angle β may be chosen based on a desired viewing distance of a display that employs the multi-directional backlight 100, for example. FIG. 3B illustrates a cant angle β defined by the cant between the first multiview backlight 110 and the second multiview backlight 120 of the multi-directional backlight 100, by way of example and not limitation. The surface normals are illustrated by an arrow extending from each of the first multiview backlight 110 and the second multiview backlight 120 in FIGS. 3B-3C.

In some embodiments (e.g., as illustrated in FIG. 3B), the second multiview backlight 120 has a cant (cant angle) that is away from the first multiview backlight 110. As such, in these embodiments respective surface normals of the first and second multiview backlights 110, 120 diverge from one another, as illustrated in FIG. 3B. In other embodiments (e.g., as illustrated in FIG. 3C), the second multiview backlight 120 has a cant that is toward the first multiview backlight 110. In these embodiments, respective surface normals of the first and second multiview backlights 110, 120 may converge to cross one another, as illustrated in FIG. 3C.

In some embodiments, the cant between the first multiview backlight 110 and the second multiview backlight 120 is variable. In these embodiments, the cant angle β between the first and second multiview backlights 110, 120 may be variable, e.g., the cant angle β may be adjustable in real time or during operation. For example (not illustrated), the first multiview backlight 110 and the second multiview backlight 120 may be connected to one another using a hinge assembly configured to provide variability of the cant or the cant angle β. For example, the hinge assembly may comprise substantially any structure or material that provides both connection between the first and second multiview backlights 110, 120 along with variability of the cant or cant angle β including, but not limited to, a mechanical hinge and a flexible material film or strip (e.g., a plastic or metal film). In some embodiments, a material (e.g., a light guide or substrate) structure of the first multiview backlight 110 and the second multiview backlight 120 is continuous or substantially continuous across an interface or junction between the first and second multiview backlights 110, 120. In other embodiments, the first and second multiview backlights 110, 120 are separate multiview backlights, albeit perhaps coupled or connected by a hinge or similar connection mechanism.

In some embodiments (not illustrated), the multi-directional backlight 100 may further comprise a third multiview backlight. As with the first and second multiview backlights 110, 120, the third multiview backlight comprises an array of multibeam elements configured to provide emitted light having a third angular range. According to these embodiments, the emitted light provided by the third multiview backlight comprises directional light beams having directions corresponding to view directions of a third multiview image. Further, the third angular range of the emitted light provide by the third multiview is mutually exclusive of one or both of the first angular range $\gamma_1$ and the second angular range $\gamma_2$. In yet other embodiments (not illustrated), the multi-directional backlight 100 may further comprise additional multiview backlights, e.g., a fourth multiview backlight, a fifth multiview backlight, and so on.

In some embodiments, one or both of the first and second multiview backlights 110, 120 may comprise a light guide configured to guide light as guided light, the multibeam elements being separated from one another and distributed across the light guide as an array of multibeam elements. In these embodiments, each multibeam element of the multibeam element array is configured scatter out a portion of the guided light as the directional light beams. In some embodiments that include a light guide, a multibeam element comprises one or more of a diffraction grating configured to diffractively scatter out the guided light portion, a micro-refractive element configured to refractively scatter out the guided light portion, and a micro-reflective element configured to reflectively scatter out the guided light portion.

In other embodiments, the multibeam elements of the first and second multiview backlights 110, 120 may comprise active emitters distributed across a substrate as an array of multibeam emitters. In some embodiments, the active emitter of a multibeam element may comprise a micro light emitting diode (microLED or μLED). Herein, μLED is defined as a microscopic light emitting diode (LED), i.e., an LED having microscopic dimensions. In some embodiments, the μLED may comprise a plurality of μLEDs. In some embodiments, the active emitter may comprise an organic light emitting diode (OLED). As defined herein, an OLED is an emitter having an emissive electroluminescent film or layer comprising an organic compound configured to emit light in response to an electric current or similar electrical stimulus. In yet other embodiments, another type of optical emitter may be used as the active optical emitter such as, but not limited to, an LED, a high intensity LED, and a quantum dot LED.

Figure 4A:
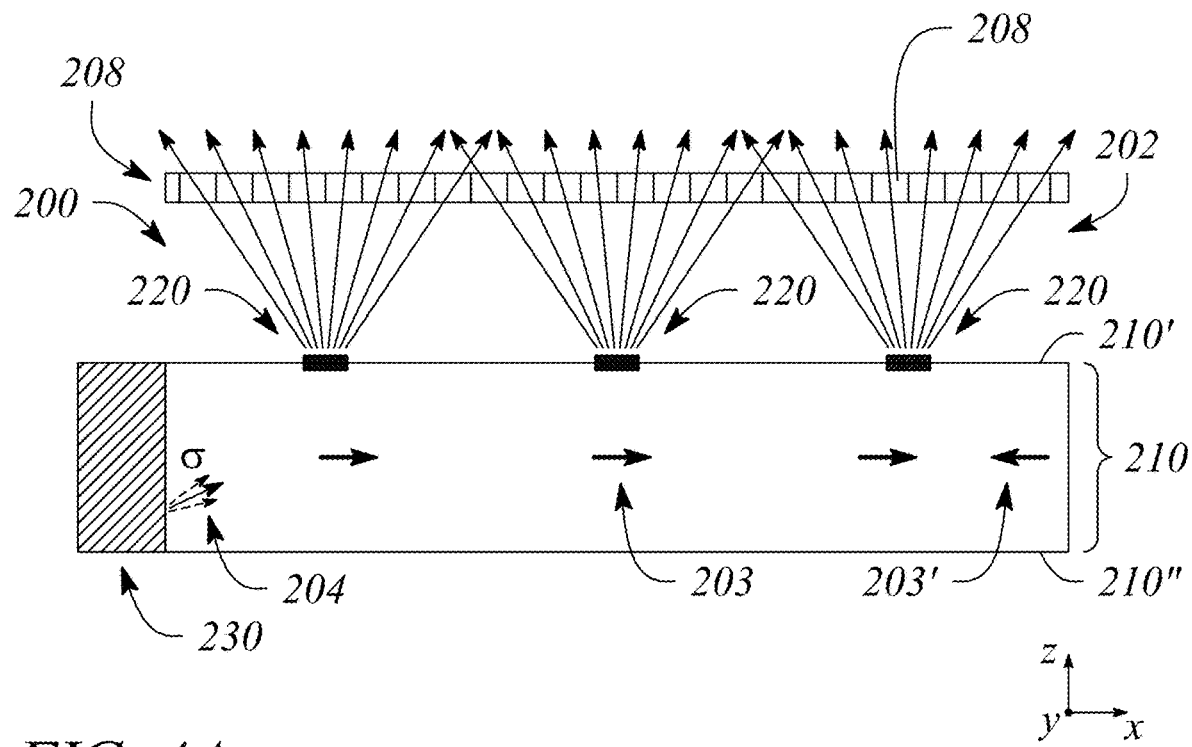
FIG. 4A illustrates a cross-sectional view of a multiview backlight in an example, according to an embodiment consistent with the principles described herein.
Figure 4B:
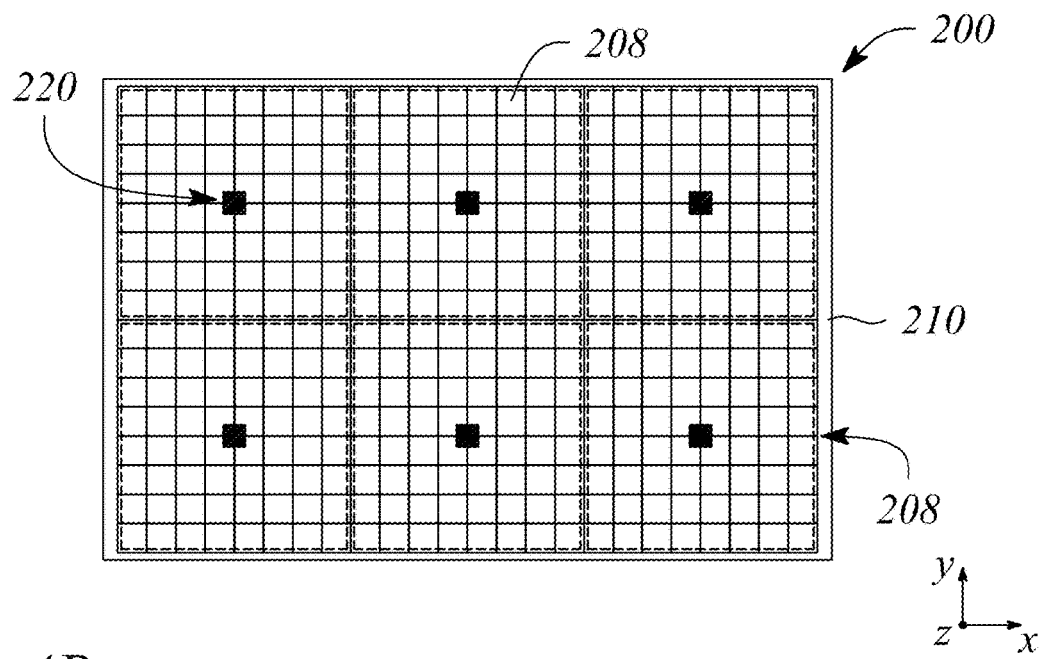
FIG. 4B illustrates a plan view of a multiview backlight in an example, according to an embodiment consistent with the principles described herein.
Figure 4C:
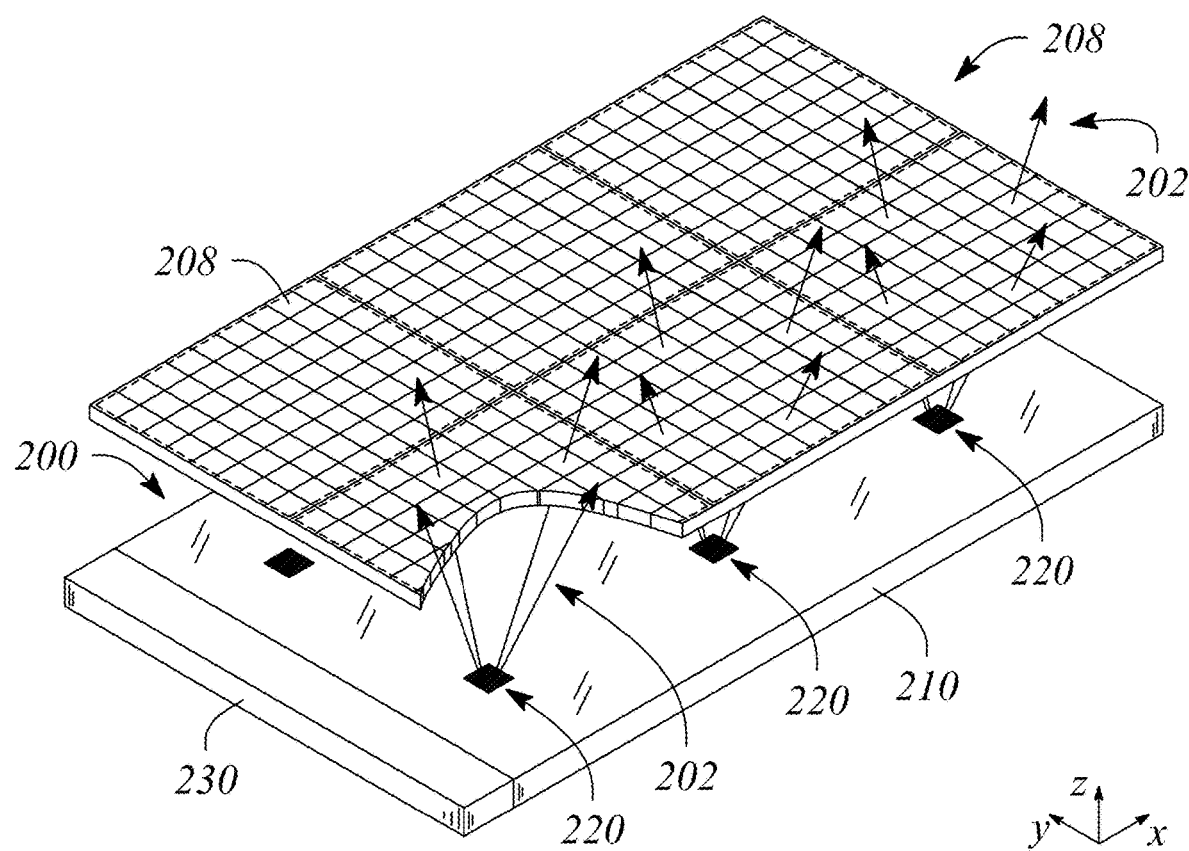
FIG. 4C illustrates a perspective view of a multiview backlight in an example, according to an embodiment consistent with the principles described herein.

FIG. 4A illustrates a cross-sectional view of a multiview backlight 200 in an example, according to an embodiment consistent with the principles described herein. FIG. 4B illustrates a plan view of a multiview backlight 200 in an example, according to an embodiment consistent with the principles described herein. FIG. 4C illustrates a perspective view of a multiview backlight 200 in an example, according to an embodiment consistent with the principles described herein. The perspective view in FIG. 4C is illustrated with a partial cut-away to facilitate discussion herein only. According to various embodiments, the multiview backlight 200 may represent or be used as one or both of the first and second multiview backlights 110, 120, described above.

The multiview backlight 200 illustrated in FIGS. 4A-4C is configured to provide emitted light comprising a plurality of directional light beams 202 having different principal angular directions from one another (e.g., as a light field). In particular, the plurality of directional light beams 202 of the emitted light are directed away from the multiview backlight 200 in different principal angular directions corresponding to respective view directions of multiview image or equivalently of a multiview display configured to display the multiview image, according to various embodiments. In some embodiments, the directional light beams may be modulated (e.g., using light valves, as described below) to facilitate the display of multiview information having 3D content, e.g., the multiview image. In FIGS. 4A-4C, the directional light beams 202 of the emitted light are illustrated as arrows extending away from the multiview backlight 200. Further, the emitted light comprising the plurality of directional light beams 202 may represent the emitted light 102a, 102b and directional light beams thereof provided respectively by first and second multiview backlights 110, 120 of the multi-directional backlight 100, in some embodiments.

As illustrated in FIGS. 4A-4C, the multiview backlight 200 comprises a light guide 210. The light guide 210 may be a plate light guide, according to some embodiments. The light guide 210 is configured to guide light along a length of the light guide 210 as guided light 204. For example, the light guide 210 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 204 according to one or more guided modes of the light guide 210, for example.

In some embodiments, the light guide 210 may be a slab or plate optical waveguide comprising an extended, substantially planar sheet of optically transparent, dielectric material. The substantially planar sheet of dielectric material is configured to guide the guided light 204 (or guided light beam) using total internal reflection. According to various examples, the optically transparent material of the light guide 210 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 210 may further include a cladding layer (not illustrated) on at least a portion of a surface (e.g., one or both of the top surface and the bottom surface) of the light guide 210. The cladding layer may be used to further facilitate total internal reflection, according to some examples.

Further, according to some embodiments, the light guide 210 is configured to guide the guided light 204 according to total internal reflection at a non-zero propagation angle between a first surface 210' (e.g., 'front' surface or side) and a second surface 210" (e.g., 'back' surface or side) of the light guide 210. In particular, the guided light 204 propagates by reflecting or 'bouncing' between the first surface 210' and the second surface 210" of the light guide 210 at the non-zero propagation angle. In some embodiments, a plurality of guided light beams 204 comprising different colors of light may be guided by the light guide 210 at respective ones of different color-specific, non-zero propagation angles. Note, the non-zero propagation angle is not illustrated in FIGS. 4A-4C for simplicity of illustration. However, a bold arrow depicting a propagation direction 203 illustrates a general propagation direction of the guided light 204 along the light guide length in FIG. 4A.

As defined herein, a 'non-zero propagation angle' is an angle relative to a surface (e.g., the first surface 210' or the second surface 210") of the light guide 210. Further, the non-zero propagation angle is both greater than zero and less than a critical angle of total internal reflection within the light guide 210, according to various embodiments. For example, the non-zero propagation angle of the guided light 204 may be between about ten degrees (10°) and about fifty degrees (50°) or, in some examples, between about twenty degrees (20°) and about forty degrees (40°), or between about twenty-five degrees (25°) and about thirty-five degrees (35°). For example, the non-zero propagation angle may be about thirty degrees (30°). In other examples, the non-zero propagation angle may be about 20°, or about 25°, or about 35°. Moreover, a specific non-zero propagation angle may be chosen (e.g., arbitrarily) for a particular implementation as long as the specific non-zero propagation angle is chosen to be less than the critical angle of total internal reflection within the light guide 210.

The guided light 204 in the light guide 210 may be introduced or coupled into the light guide 210 at the non-zero propagation angle (e.g., about 30-35 degrees). One or more of a lens, a mirror or similar reflector (e.g., a tilted collimating reflector), a diffraction grating, and a prism (not illustrated) may facilitate coupling light into an input end of the light guide 210 as the guided light 204 at the non-zero propagation angle, for example. Once coupled into the light guide 210, the guided light 204 propagates along the light guide 210 in a direction that may be generally away from the input end (e.g., illustrated by bold arrows pointing along an x-axis in FIG. 4A).

Further, the guided light 204 or equivalently the guided light 204 produced by coupling light into the light guide 210 may be a collimated light beam, according to various embodiments. Herein, a 'collimated light' or 'collimated light beam' is generally defined as a beam of light in which rays of the light beam are substantially parallel to one another within the light beam (e.g., the guided light 204). Further, rays of light that diverge or are scattered from the collimated light beam are not considered to be part of the collimated light beam, by definition herein. In some embodiments, the multiview backlight 200 may include a collimator, such as a lens, reflector or mirror, as described above, (e.g., tilted collimating reflector) to collimate the light, e.g., from a light source. In some embodiments, the light source comprises a collimator. The collimated light provided to the light guide 210 is a collimated guided light beam. The guided light beam of the guided light 204 may be collimated according to or having a collimation factor, as described above, in various embodiments.

In some embodiments, the light guide 210 may be configured to 'recycle' the guided light 204. In particular, the guided light 204 that has been guided along the light guide length may be redirected back along that length in another propagation direction 203' that differs from the propagation direction 203. For example, the light guide 210 may include a reflector (not illustrated) at an end of the light guide 210 opposite to an input end adjacent to the light source. The reflector may be configured to reflect the guided light 204 back toward the input end as recycled guided light. Recycling guided light 204 in this manner may increase a brightness of the multiview backlight 200 (e.g., an intensity of the directional light beams 202) by making guided light available more than once, for example, to multibeam elements, described below.

In FIG. 4A, a bold arrow indicating a propagation direction 203' of recycled guided light (e.g., directed in a negative x-direction) illustrates a general propagation direction of the recycled guided light within the light guide 210. Alternatively (e.g., as opposed to recycling guided light), guided light 204 propagating in the other propagation direction 203' may be provided by introducing light into the light guide 210 with the other propagation direction 203' (e.g., in addition to guided light 204 having the propagation direction 203).

As illustrated in FIGS. 4A-4C, the multiview backlight 200 further comprises a plurality of multibeam elements 220 spaced apart from one another along the light guide length. In particular, the multibeam elements 220 of the plurality are separated from one another by a finite space and represent individual, distinct elements along the light guide length. That is, by definition herein, the multibeam elements 220 of the plurality are spaced apart from one another according to a finite (i.e., non-zero) inter-element distance (e.g., a finite center-to-center distance). Further the multibeam elements 220 of the plurality generally do not intersect, overlap or otherwise touch one another, according to some embodiments. As such, each multibeam element 220 of the plurality is generally distinct and separated from other ones of the multibeam elements 220.

According to some embodiments, the multibeam elements 220 of the plurality may be arranged in either a one-dimensional (1D) array or two-dimensional (2D) array. For example, the plurality of multibeam elements 220 may be arranged as a linear 1D array. In another example, the plurality of multibeam elements 220 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 220 may be substantially uniform or constant across the array. In other examples, the inter-element distance between the multibeam elements 220 may be varied one or both of across the array and along the length of the light guide 210.

According to various embodiments, a multibeam element 220 of the plurality is configured to couple or scatter out a portion of the guided light 204 as the plurality of directional light beams 202. In particular, FIGS. 4A and 4C illustrate the directional light beams 202 as a plurality of diverging arrows depicted as being directed way from the first (or front) surface 210' of the light guide 210. Further, a size of the multibeam element 220 is comparable to a size of a light valve (described below) of a multiview display, according to various embodiments.

FIGS. 4A-4C further illustrate an array of light valves 208 configured to modulate the directional light beams 202 of the directional light beam plurality. The light valve array may be part of a multiview display that employs the multiview backlight, for example, and is illustrated in FIGS. 4A-4C along with the multiview backlight 200 for the purpose of facilitating discussion herein. In FIG. 4C, the array of light valves 208 is partially cut-away to allow visualization of the light guide 210 and the multibeam element 220 underlying the light valve array.

As illustrated in FIGS. 4A-4C, different ones of the directional light beams 202 having different principal angular directions pass through and may be modulated by different ones of the light valves 208 in the light valve array. Further, as illustrated, a light valve 208 of the array may corresponds to a pixel, and a set of the light valves 208 corresponds to a multiview pixel of a multiview display. In particular, a different set of light valves 208 of the light valve array is configured to receive and modulate the directional light beams 202 from different ones of the multibeam elements 220, i.e., there is one unique set of light valves 208 for each multibeam element 220, as illustrated. In various embodiments, different types of light valves may be employed as the light valves 208 of the light valve array including, but not limited to, one or more of liquid crystal light valves, electrophoretic light valves, and light valves based on electrowetting.

According to various embodiments, the multibeam elements 220 may comprise any of a number of different structures configured to couple or scatter out a portion of the guided light 204. For example, the different structures may include, but are not limited to, diffraction gratings, micro-reflective elements, micro-refractive elements, or various combinations thereof. In some embodiments, the multibeam element 220 comprising a diffraction grating is configured to diffractively scatter out the guided light portion as the plurality of directional light beams 202 having the different principal angular directions. In other embodiments, the multibeam element 220 comprising a micro-reflective element is configured to reflectively couple or scatter out the guided light portion as the plurality of directional light beams 202, or the multibeam element 220 comprising a micro-refractive element is configured to couple or scatter out the guided light portion as the plurality of directional light beams 202 by or using refraction (i.e., refractively scatter out the guided light portion).

Figure 5A:
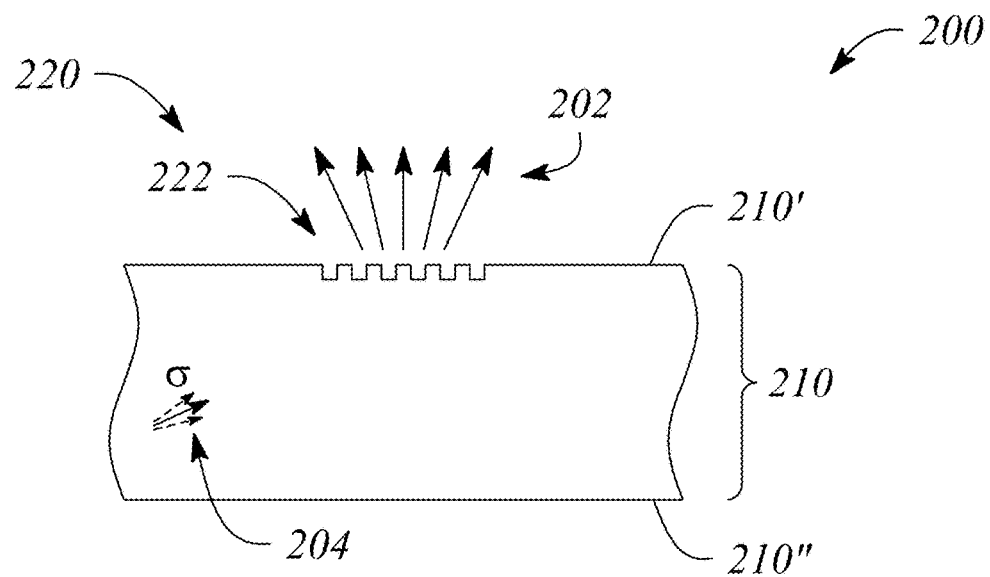
FIG. 5A illustrates a cross sectional view of a portion of a multiview backlight including a multibeam element in an example, according to an embodiment consistent with the principles described herein.
Figure 5B:
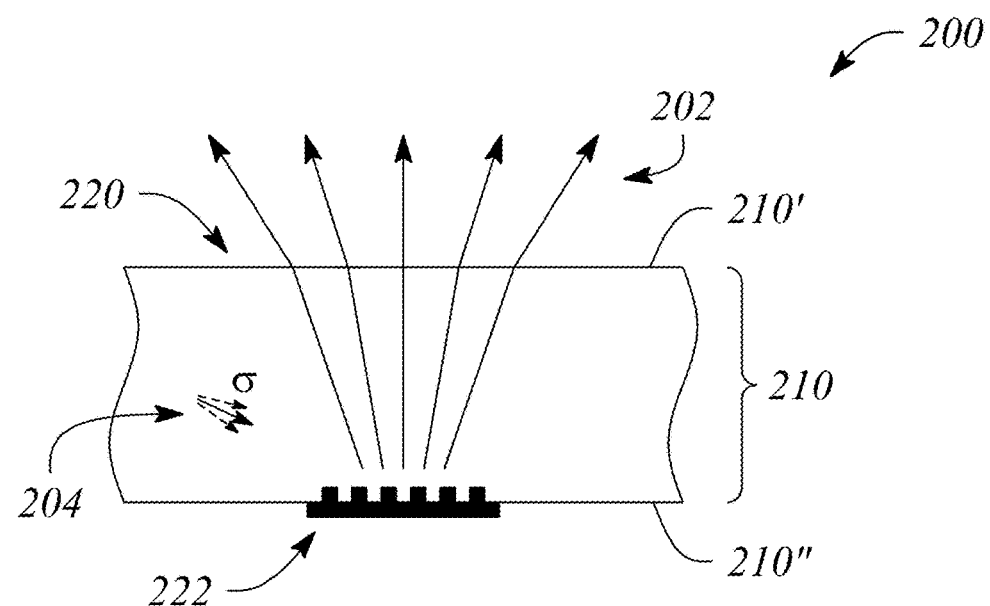
FIG. 5B illustrates a cross sectional view of a portion of a multiview backlight including a multibeam element in an example, according to another embodiment consistent with the principles described herein.

FIG. 5A illustrates a cross sectional view of a portion of a multiview backlight 200 including a multibeam element 220 in an example, according to an embodiment consistent with the principles described herein. FIG. 5B illustrates a cross sectional view of a portion of a multiview backlight 200 including a multibeam element 220 in an example, according to another embodiment consistent with the principles described herein. In particular, FIGS. 5A-5B illustrate the multibeam element 220 of the multiview backlight 200 comprising a diffraction grating 222. The diffraction grating 222 is configured to diffractively scatter out a portion of the guided light 204 as the plurality of directional light beams 202. The diffraction grating 222 comprises a plurality of diffractive features spaced apart from one another by a diffractive feature spacing or a diffractive feature or grating pitch configured to provide diffractive coupling out of the guided light portion. According to various embodiments, the spacing or grating pitch of the diffractive features in the diffraction grating 222 may be sub-wavelength (i.e., less than a wavelength of the guided light).

In some embodiments, the diffraction grating 222 of the multibeam element 220 may be located at or adjacent to a surface of the light guide 210. For example, the diffraction grating 222 may be at or adjacent to the first surface 210' of the light guide 210, as illustrated in FIG. 5A. In another example, as illustrated in FIG. 5B, the diffraction grating 222 may be located at or adjacent to the second surface 210" of the light guide 210. When located at the second surface 210", the diffraction grating 222 may be a reflection mode diffraction grating. As a reflection mode diffraction grating, the diffraction grating 222 is configured to both diffract the guided light portion and reflect the diffracted guided light portion toward the first surface 210' to exit through the first surface 210' as the diffractively scatter-out directional light beams 202. In other embodiments (not illustrated), the diffraction grating 222 may be located between the surfaces of the light guide 210, e.g., as one or both of a transmission mode diffraction grating and a reflection mode diffraction grating.

According to some embodiments, the diffractive features of the diffraction grating 122 may comprise one or both of grooves and ridges that are spaced apart from one another. The grooves or the ridges may comprise a material of the light guide 210, e.g., may be formed in a surface of the light guide 210. In another example, the grooves or the ridges may be formed from a material other than the light guide material, e.g., a film or a layer of another material on a surface of the light guide 210.

In some embodiments, the diffraction grating 222 of the multibeam element 220 is a uniform diffraction grating in which the diffractive feature spacing is substantially constant or unvarying throughout the diffraction grating 222. In other embodiments, the diffraction grating 222 is a chirped diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance, while in other embodiments the chirped diffraction grating may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

Figure 6A:
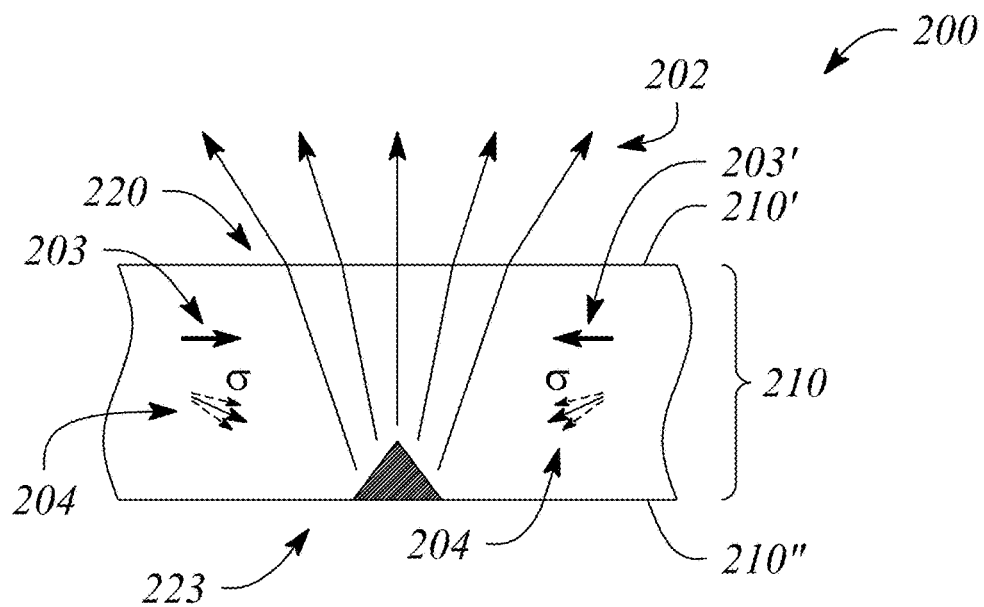
FIG. 6A illustrates a cross sectional view of a portion of a multiview backlight including a multibeam element in an example, according to another embodiment consistent with the principles described herein.
Figure 6B:
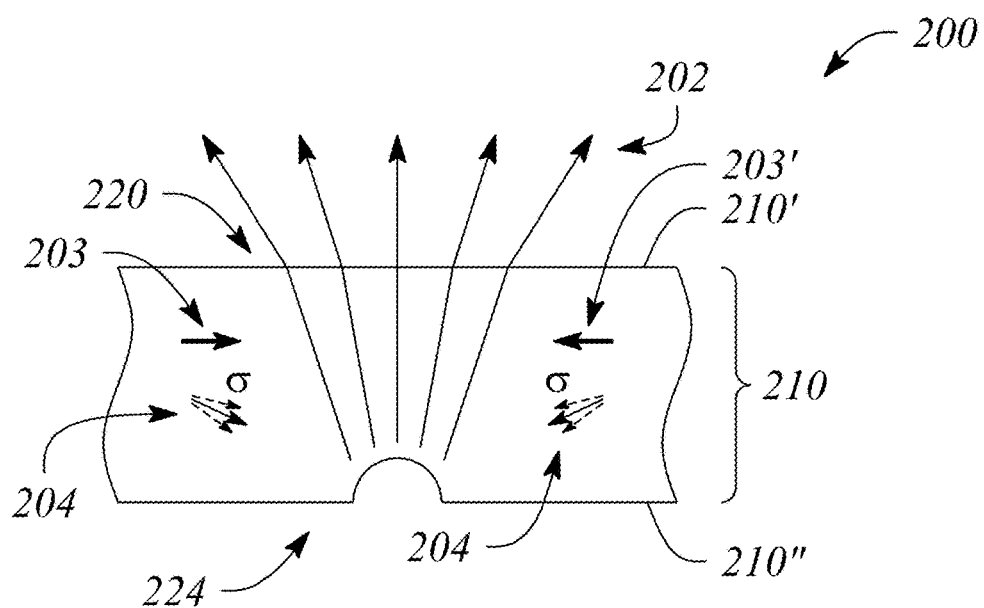
FIG. 6B illustrates a cross sectional view of a portion of a multiview backlight including a multibeam element in an example, according to another embodiment consistent with the principles described herein.

FIG. 6A illustrates a cross sectional view of a portion of a multiview backlight 200 including a multibeam element 220 in an example, according to another embodiment consistent with the principles described herein. FIG. 6B illustrates a cross sectional view of a portion of a multiview backlight 200 including a multibeam element 220 in an example, according to another embodiment consistent with the principles described herein. In particular, FIGS. 6A and 6B illustrate various embodiments of the multibeam element 220 comprising a micro-reflective element. Micro-reflective elements used as or in the multibeam element 220 may include, but are not limited to, a reflector that employs a reflective material or layer thereof (e.g., a reflective metal) or a reflector based on total internal reflection (TIR). According to some embodiments (e.g., as illustrated in FIGS. 6A-6B), the multibeam element 220 comprising the micro-reflective element may be located at or adjacent to a surface (e.g., the second surface 210") of the light guide 210. In other embodiments (not illustrated), the micro-reflective element may be located within the light guide 210 between the first and second surfaces 210', 210".

For example, FIG. 6A illustrates the multibeam element 220 comprising a micro-reflective element 223 having reflective facets (e.g., a 'prismatic' micro-reflective element) located adjacent to the second surface 210" of the light guide 210. The facets of the illustrated prismatic micro-reflective element 223 are configured to reflect (i.e., reflectively couple or scatter) the portion of the guided light 204 out of the light guide 210. The facets may be slanted or tilted (i.e., have a tilt angle) relative to a propagation direction of the guided light 204 to reflect the guided light portion out of light guide 210, for example. The facets may be formed using a reflective material within the light guide 210 (e.g., as illustrated in FIG. 6A) or may be surfaces of a prismatic cavity in the second surface 210", according to various embodiments. When a prismatic cavity is employed, either a refractive index change at the cavity surfaces may provide reflection (e.g., TIR reflection) or the cavity surfaces that form the facets may be coated by a reflective material to provide reflection, in some embodiments.

In another example, FIG. 6B illustrates the multibeam element 220 comprising a micro-reflective element 224 having a substantially smooth, curved surface such as, but not limited to, a semi-spherical micro-reflective element 224. A specific surface curve of the micro-reflective element 224 may be configured to reflect the guided light portion in different directions depending on a point of incidence on the curved surface with which the guided light 204 makes contact, for example. As illustrated in FIGS. 6A and 6B, the guided light portion that is reflectively scattered out of the light guide 210 exits or is emitted from the first surface 210', by way of example and not limitation. As with the prismatic micro-reflective element 223 in FIG. 6A, the micro-reflective element 224 in FIG. 6B may be either a reflective material within the light guide 210 or a cavity (e.g., a semi-circular cavity) formed in the second surface 210", as illustrated in FIG. 6B by way of example and not limitation. FIGS. 6A and 6B also illustrate the guided light 204 having two propagation directions 203, 203' (i.e., illustrated as bold arrows), by way of example and not limitation. Using two propagation directions 203, 203' may facilitate providing the plurality of directional light beams 202 with symmetrical principal angular directions, for example.

Figure 7:
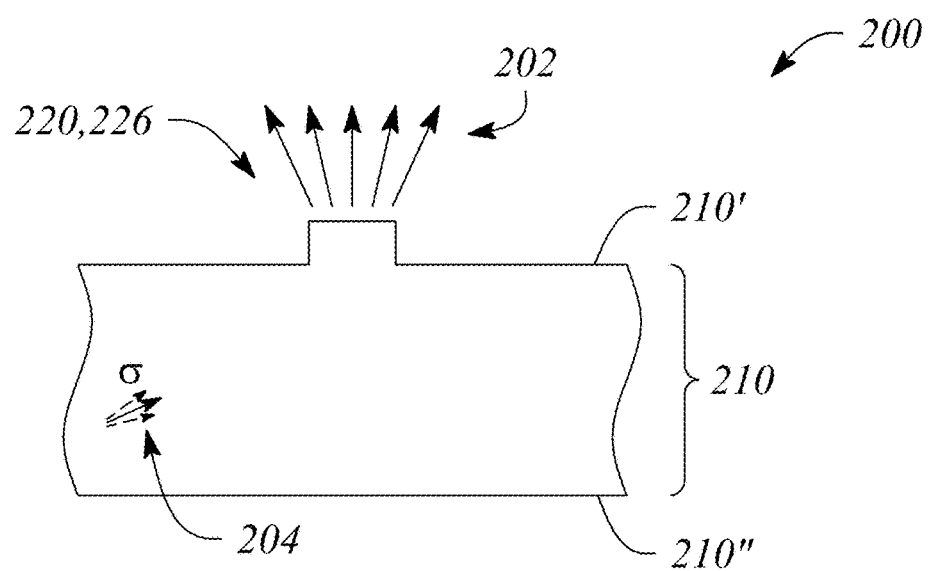
FIG. 7 illustrates a cross sectional view of a portion of a multiview backlight including a multibeam element in an example, according to another embodiment consistent with the principles described herein.

FIG. 7 illustrates a cross sectional view of a portion of a multiview backlight 200 including a multibeam element 220 in an example, according to another embodiment consistent with the principles described herein. In particular, FIG. 7 illustrates a multibeam element 220 comprising a micro-refractive element 226. According to various embodiments, the micro-refractive element 226 is configured to refractively couple or scatter out a portion of the guided light 204 from the light guide 210. That is, the micro-refractive element 226 is configured to employ refraction (e.g., as opposed to diffraction or reflection) to scatter out the guided light portion from the light guide 210 as the directional light beams 202, as illustrated in FIG. 7. The micro-refractive element 226 may have various shapes including, but not limited to, a semi-spherical shape, a rectangular shape or a prismatic shape (i.e., a shape having sloped facets). According to various embodiments, the micro-refractive element 226 may extend or protrude out of a surface (e.g., the first surface 110') of the light guide 210, as illustrated, or may be a cavity in the surface (not illustrated). Further, the micro-refractive element 226 may comprise a material of the light guide 210, in some embodiments. In other embodiments, the micro-refractive element 226 may comprise another material adjacent to, and in some examples, in contact with the light guide surface.

Referring again to FIG. 4A, the multiview backlight 200 may further comprise a light source 230. According to various embodiments, the light source 230 is configured to provide the light to be guided within light guide 210. In particular, the light source 230 may be located adjacent to an entrance surface or end (input end) of the light guide 210. In various embodiments, the light source 230 may comprise substantially any source of light (e.g., optical emitter) including, but not limited to, one or more light emitting diodes (LEDs) or a laser (e.g., laser diode). In some embodiments, the light source 230 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 230 may be a substantially broadband light source configured to provide substantially broadband or polychromatic light. For example, the light source 230 may provide white light. In some embodiments, the light source 230 may comprise a plurality of different optical emitters configured to provide different colors of light. The different optical emitters may be configured to provide light having different, color-specific, non-zero propagation angles of the guided light corresponding to each of the different colors of light.

In some embodiments, the light source 230 may further comprise a collimator. The collimator may be configured to receive substantially uncollimated light from one or more of the optical emitters of the light source 230. The collimator is further configured to convert the substantially uncollimated light into collimated light. In particular, the collimator may provide collimated light having the non-zero propagation angle and being collimated according to a predetermined collimation factor, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light beam to the light guide 210 to propagate as the guided light 204, described above.

In accordance with some embodiments of the principles described herein, a multi-user multiview display is provided. The multi-user multiview display is configured to emit modulated light beams as pixels of the multiview display in a plurality of different directions, or view zones to be viewed by a corresponding plurality of different users. Further, the emitted modulated light beams may be preferentially directed toward a plurality of viewing directions of a multiview image displayed by the multi-user multiview display. In some examples, the multi-user multiview display is configured to provide or 'display' a 3D or multiview image in each of the different view zones. Different ones of the modulated, differently directed light beams may correspond to individual pixels of different 'views' associated with the multiview image in the different view zones, according to various embodiments. The different views may provide a 'glasses free' (e.g., autostereoscopic) representation of information in the multiview image being displayed by the multi-user multiview display, for example.

Figure 8:
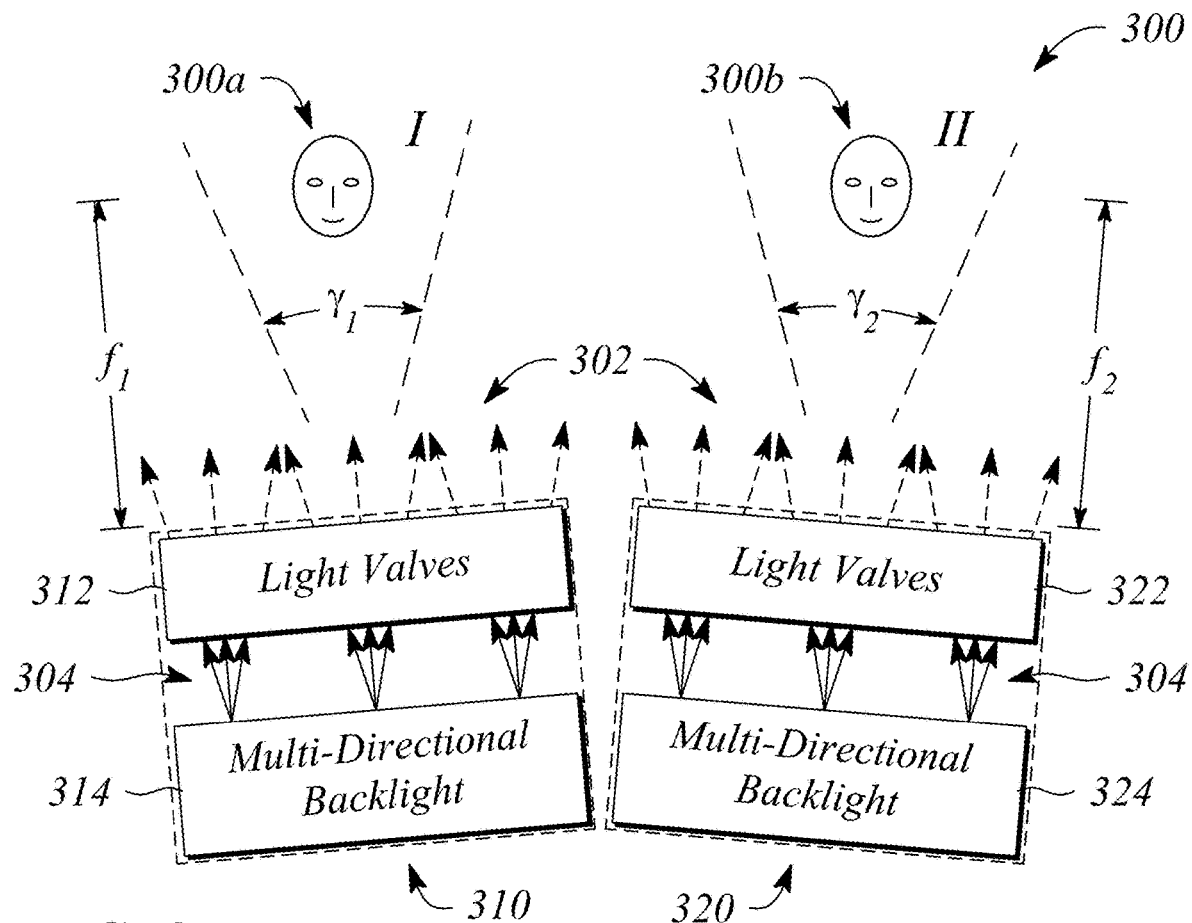
FIG. 8 illustrates a block diagram of a multiview display in an example, according to an embodiment consistent with the principles described herein.

FIG. 8 illustrates a block diagram of a multi-user multiview display 300 in an example, according to an embodiment consistent with the principles described herein. According to various embodiments, the multi-user multiview display 300 is configured to display a multiview image according to different views in different view directions as well as different multiview images in the different view zones. In particular, modulated light beams 302 emitted by the multi-user multiview display 300 are used to display the multiview images and may correspond to pixels of the different views (i.e., view pixels) within those multiview images. The modulated light beams 302 are illustrated as arrows in FIG. 8 and dashed lines are used for the arrows of the emitted modulated light beams 302 to emphasize the modulation thereof by way of example and not limitation.

The multi-user multiview display 300 illustrated in FIG. 8 comprises a first multiview display 310 configured to provide a first multiview image to a first view zone I having a first angular range $\gamma_1$. The first multiview image has a first convergence distance $f_1$ corresponding to an interocular distance of a first user 300a. As illustrated, the multi-user multiview display 300 further comprises a second multiview display 320 configured to provide a second multiview image to a second view zone II having a second angular range $\gamma_2$. The second multiview image has a second convergence distance $f_2$ corresponding to an interocular distance of a second user 300b. According to various embodiments, the first view zone I may be configured to preferentially provide the first multiview image to the first user 300a and the second view zone II may be configured to preferentially provide the second multiview image to the second user 300b.

In some embodiments, the first angular range $\gamma_1$ of the first view zone I and the second angular range $\gamma_2$ of the second view zone II are mutually exclusive angular ranges. In some embodiments, the second multiview display 320 has a cant relative to the first multiview display 310 defining a cant angle. In some embodiments, the cant between the first and second multiview displays 310, 320 may be variable, the cant angle being a variable angle, e.g., using a hinge assembly to connect the first and second multiview displays 310, 320.

In some embodiments, one or both of first multiview display 310 and the second multiview display 320 of the multi-user multiview display 300 may comprise a light guide configured to guide light as guided light, an array of multibeam elements spaced apart from one another across the light guide, and an array of light valves configured to modulate the directional light beams as a multiview image. Further, each multibeam element of the multibeam element array may be configured to scatter out a portion of the guided light as directional light beams of emitted light 304 having directions corresponding to a multiview image.

In particular, in some embodiments the multi-user multiview display 300 may comprise a multi-directional backlight that is substantially similar to the multi-directional backlight 100, described above. In these embodiments, the first multiview display 310 may comprise a first array of light valves 312 configured to modulate directional light beams of the emitted light 304 provided by a first multiview backlight 314 as the first multiview image. In some embodiments, the first multiview backlight 314 may be substantially similar to the above-described first multiview backlight 110 of the multi-directional backlight 100. Further in these embodiments, the second multiview display 320 may comprise a second array of light valves 322 configured to modulate directional light beams of the emitted light 304 provided by a second multiview backlight 324 as the second multiview image. In some embodiments, the second multiview backlight 324 may be substantially similar to the above-described first multiview backlight 110 of the multi-directional backlight 100. Additionally, the first and second array of light valves 312, 322 may be substantially similar to the above-described array of light valves 208, in some embodiments. As such, the first multiview image may be configured to be viewed by the first user 300a in the first view zone I corresponding to the first angular range $\gamma_1$ and the second multiview image may be configured to be viewed by the second user 300b in the second view zone II corresponding to the second angular range $\gamma_2$.

Figure 9:
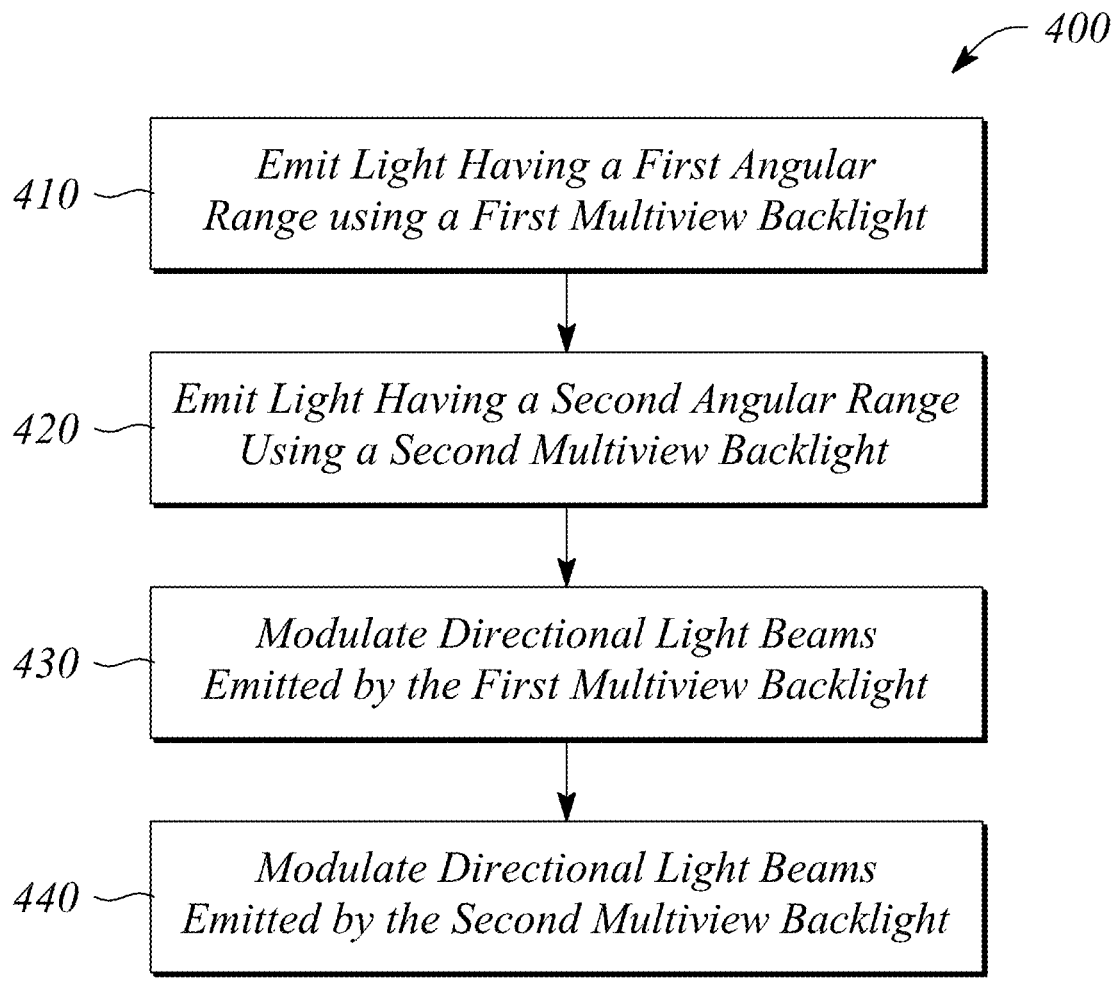
FIG. 9 illustrates a flow chart of a method of multiview backlight operation in an example, according to an embodiment consistent with the principles described herein.

In accordance with other embodiments of the principles described herein, a method of multi-directional backlight operation is provided. FIG. 9 illustrates a flow chart of a method 400 of multi-directional backlight operation in an example, according to an embodiment consistent with the principles described herein. As illustrated in FIG. 9, the method 400 of multi-directional backlight operation comprises emitting 410 light having a first angular range using a first multiview backlight comprising multibeam elements. The light emitted by the first multiview backlight comprises directional light beams with directions corresponding to view directions of a first multiview image having a first convergence distance, according to various embodiments. According to some embodiments, the first multiview backlight and first angular range may be substantially similar to the first multiview backlight 110 and first angular range $\gamma_1$ described above with respect to the multi-directional backlight 100.

As illustrated in FIG. 9, the method 400 of multi-directional backlight operation further comprises emitting 420 light having a second angular range using a second multiview backlight comprising multibeam elements. The light emitted by the second multiview backlight comprising directional light beams with directions corresponding to a second multiview image having a second convergence distance, according to various embodiments. In some embodiments, the second multiview backlight and second angular range may be substantially similar to the second multiview backlight 120 and second angular range $\gamma_2$ of the above-described multi-directional backlight 100.

In particular, the first angular range and second angular range are mutually exclusive angular ranges, in various embodiments. Further, in some embodiments, the second multiview backlight has a cant relative to the first multiview backlight, an angle between a surface normal of the second multiview backlight and a surface normal of the first multiview backlight defining an oblique angle. In some embodiments, one or both of first multiview backlight and the second multiview backlight comprises a light guide configured to guide light as guided light, the multibeam elements being spaced apart from one another across the light guide, each of the multibeam elements being configured to scatter out a portion of the guided light as directional light beams having directions corresponding to a multiview image.

In some embodiments (not illustrated), the method 400 of multi-directional backlight operation further comprises modulating 430 the directional light beams of the light emitted by the first multiview backlight using a first array of light valves to provide the first multiview image. In some embodiments (not illustrated), the method 400 of multi-directional backlight operation further comprises modulating 440 the directional light beams of the light emitted by the second multiview backlight using a second array of light valves to provide the second multiview image. In various embodiments, a first view zone defined by the first angular range preferentially provides the first multiview image to a first user located at the first convergence distance, and a second view zone defined by the second angular range preferentially provides the second multiview image to a second user located at the second convergence distance. In some embodiments, one or both of the first light valve array and the second light valve array may be substantially similar to the array of light valves 208, described above with respect to the multi-directional backlight 100. Note that when the method 400 of multi-directional backlight operation includes modulating 430, 440 the directional light beams, the method 400 may also represent a method of multi-user multiview display operation.

Thus, there have been described examples and embodiments of a multi-directional backlight, a multi-user multiview display, and a method of multi-directional backlight operation. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview display, comprising:
    a first multiview backlight comprising multibeam elements configured to provide emitted light having first angular range, the emitted light provided by the first multiview backlight comprising first directional light beams with directions corresponding to view directions of a first multiview image having a first convergence distance;
    a second multiview backlight comprising multibeam elements configured to provide emitted light having a second angular range, the emitted light provided by the second multiview backlight comprising second directional light beams with directions corresponding to a second multiview image having a second convergence distance, the first angular range and second angular range being mutually exclusive angular ranges at the first and second convergence distances;
    a first array of light valves configured to modulate the first directional light beams as the first multiview image; and
    a second array of light valves configured to modulate the second directional light beams as the second multiview image, the first and second arrays of light valves being non-overlapping.

2. The multiview display of claim 1, wherein the second multiview backlight has a cant relative to the first multiview backlight.

3. The multiview display of claim 2, wherein the cant between the first multiview backlight and the second multiview backlight is variable.

4. The multiview display of claim 3, wherein the first multiview backlight and the second multiview backlight are connected to one another using a hinge assembly configured to provide cant variability.

5. The multiview display of claim 1, wherein the second multiview backlight has a cant that is away from the first multiview backlight, respective surface normals of the first and second multiview backlights diverging from each other.

6. The multiview display of claim 1, wherein the second multiview backlight has a cant that is toward the first multiview backlight, respective surface normals of the first and second multiview backlights converging to cross each other.

7. The multiview display of claim 1, further comprising a third multiview backlight comprising an array of multibeam elements configured to provide emitted light having a third angular range, the emitted light provided by the third multiview backlight comprising third directional light beams having directions corresponding to view directions of a third multiview image,
    wherein the third angular range of the emitted light provided by the third multiview backlight is mutually exclusive of one or both of the first angular range and the second angular range.

8. The multiview display of claim 1, wherein the first multiview backlight comprises a light guide configured to guide light as guided light, the multibeam elements being separated from one another and distributed across the light guide as an array of multibeam elements,
    wherein each multibeam element of the multibeam element array is configured scatter out a portion of the guided light as the first directional light beams.

9. The multiview display of claim 8, wherein a multibeam element of the multibeam element array comprises one or more of a diffraction grating configured to diffractively scatter out the guided light portion, a micro-refractive element configured to refractively scatter out the guided light portion, and a micro-reflective element configured to reflectively scatter out the guided light portion.

10. The multiview display of claim 1,
    wherein the first multiview image is configured to be viewed by a first user in a first view zone corresponding to the first angular range and the second multiview image is configured to be viewed by a second user in a second view zone corresponding to the second angular range.

11. The multiview display of claim 1, wherein different views of the first multiview image are configured to be viewed by a first user at the first convergence distance, and wherein different views of the second multiview image are configured to be viewed by a second user at the second convergence distance.

12. A multi-user multiview display comprising:
    a first multiview display configured to provide a first multiview image to a first view zone having a first angular range, the first multiview display including a first multi-directional backlight configured to produce first directional light beams with directions corresponding to view directions of a first multiview image, the first multiview display including a first array of light valves configured to modulate the first directional light beams as the first multiview image, the first multiview image having a first convergence distance corresponding to an interocular distance of a first user; and a second multiview display configured to provide a second multiview image to a second view zone having a second angular range, the second multiview display including a second multi-directional backlight configured to produce second directional light beams with directions corresponding to view directions of a second multiview image, the second multiview display including a second array of light valves configured to modulate the second directional light beams as the second multiview image, the second multiview image having a second convergence distance corresponding to an interocular distance of a second user, wherein the first view zone is configured to preferentially provide the first multiview image to the first user and the second view zone is configured to preferentially provide the second multiview image to the second user, and wherein the first and second arrays of light valves are non-overlapping.

13. The multi-user multiview display of claim 12, wherein the first angular range of the first view zone and the second angular range of the second view zone are mutually exclusive angular ranges.

14. The multi-user multiview display of claim 12, wherein the second multiview display has a cant relative to the first multiview display.

15. The multi-user multiview display of claim 14, wherein the cant between the first and second multiview displays is variable.

16. The multi-user multiview display of claim 12, wherein the first multiview display comprises:

a light guide configured to guide light as guided light;

an array of multibeam elements spaced apart from one another across the light guide, each multibeam element of the multibeam element array being configured to scatter out a portion of the guided light as the first directional light beams; and an array of light valves configured to modulate the first directional light beams as the first multiview image.

17. The multi-user multiview display of claim 16, wherein a multibeam element of the multibeam element array comprises one or more of a diffraction grating configured to diffractively scatter out the guided light portion, a micro-refractive element configured to refractively scatter out the guided light portion, and a micro-reflective element configured to reflectively scatter out the guided light portion, size of the multibeam element is between one quarter and two times of a size of a light valve of the light valve array.

18. A method of multi-directional backlight operation, the method comprising:

emitting light having a first angular range using a first multiview backlight comprising multibeam elements, the light emitted by the first multiview backlight comprising first directional light beams with directions corresponding to view directions of a first multiview image having a first convergence distance;

modulating the first directional light beams with a first array of light valves to provide the first multiview image;

emitting light having a second angular range using a second multiview backlight comprising multibeam elements, the first angular range and the second angular range being mutually exclusive angular ranges, the light emitted by the second multiview backlight comprising second directional light beams with directions corresponding to a second multiview image having a second convergence distance;

modulating the second directional light beams with a second array of light valves to provide the second multiview image, and configuring the first and second arrays of light valves to be non-overlapping.

19. The method of multi-directional backlight operation of claim 18, wherein the second multiview backlight has a cant relative to the first multiview backlight, an angle between a surface normal of the second multiview backlight and a surface normal of the first multiview backlight defining an oblique angle.

20. The method of multi-directional backlight operation of claim 18, wherein a first view zone defined by the first angular range preferentially provides the first multiview image to a first user located at the first convergence distance, and wherein a second view zone defined by the second angular range preferentially provides the second multiview image to a second user located at the second convergence distance.

21. The method of multi-directional backlight operation of claim 18, wherein the first multiview backlight comprises:

a light guide configured to guide light as guided light, the multibeam elements being spaced apart from one another across the light guide, each of the multibeam elements being configured to scatter out a portion of the guided light as the first directional light beams.

* * * * *